United States Patent [19]
Ehrler

[11] Patent Number: 5,192,341
[45] Date of Patent: Mar. 9, 1993

[54] SELECTED SOLVENT COMPOSITION AND PROCESS EMPLOYING SAME

[75] Inventor: Arthur J. Ehrler, Brooklyn, Ohio

[73] Assignee: Sandoz Ltd., Basel, Switzerland

[21] Appl. No.: 782,936

[22] Filed: Oct. 25, 1991

Related U.S. Application Data

[63] Continuation of Ser. No. 623,486, Dec. 4, 1990, abandoned, which is a continuation of Ser. No. 539,502, Jun. 18, 1990, abandoned, which is a continuation of Ser. No. 432,242, Nov. 6, 1989, abandoned, which is a continuation of Ser. No. 123,227, Nov. 20, 1987, abandoned, which is a continuation of Ser. No. 24,850, Mar. 13, 1987, Pat. No. 4,708,721, which is a continuation of Ser. No. 677,233, Dec. 3, 1984, abandoned.

[51] Int. Cl.$^5$ .............................................. B01D 47/00
[52] U.S. Cl. ............................................ 55/68; 55/73
[58] Field of Search ............... 55/40, 48, 46, 68, 72, 55/73, 222, 228, 242, 189, 84, 85; 252/184, 189, 364

[56] References Cited

U.S. PATENT DOCUMENTS

| | | | |
|---|---|---|---|
| 3,738,086 | 6/1973 | Bellisio et al. | 55/48 |
| 3,755,191 | 8/1973 | Mattez et al. | 252/364 |
| 3,796,669 | 3/1974 | Kiritani et al. | 252/364 X |
| 4,705,673 | 11/1987 | Capobianco et al. | 252/189 X |

Primary Examiner—Charles Hart
Attorney, Agent, or Firm—Gerald D. Sharkin; Richard E. Vila; Walter F. Jewell

[57] ABSTRACT

In an operation wherein a gaseous stream, such as an air stream, is contacted with a liquid selective solvent for a component of the gaseous stream for the removal of said component from the gaseous stream, improved results are obtain, particularly in a direct gas-liquid countercurrent contacting operation, by employing a liquid selective solvent which has a viscosity of less than about 30 centipoises at 77° F. Suitable such solvents include diethyl phthalate, dioctyl phthalate, dioctyl adipate, acetyltributyl citrate and diisohexyl phthalate, particularly blends or mixtures thereof.

5 Claims, 2 Drawing Sheets

SELECTED SOLVENT COMPOSITION AND PROCESS EMPLOYING SAME

This is a continuation of application Ser. No. 07/623,486, filed Dec. 4, 1990, now abandoned, which in turn is a continuation of application Ser. No. 07/539,502, filed Jun. 18, 1990, now abandoned, which in turn is a continuation of application Ser. No. 07/432,242, filed Nov. 6, 1989, now abandoned, which in turn is a continuation of application Ser. No. 07/123,227, filed Nov. 20, 1987, now abandoned, which in turn is a continuation-in-part of application Ser. No. 07/024,850, filed Mar. 13, 1987, now U.S. Pat. No. 4,708,721 which in turn is a continuation of application Ser. No. 06/677,233, filed Dec. 3, 1984, now abandoned.

BACKGROUND OF THE INVENTION

In many industrial processes there are produced gaseous streams which contain materials therein which must be recovered or removed. For example, in degreasing or in paint spraying operations employing a volatile solvent there is usually produced an air or gaseous stream which contains the volatilized solvent therein and usually the solvent must be removed or recovered before the air or gaseous stream is discharged into the atmosphere. The removal and/or recovery of such volatile solvents may be required by regulatory agencies to protect the environment or for economic reasons, such as the recovery of the solvent so that it can be recycled or again utilized. In many other industries, such as in the semi-conductor industry and in other processing operations, particularly in the petroleum industry, there are produced gaseous and/or liquid streams which contain materials, which must be removed or recovered.

The recovery of materials, e.g. volatile solvents or treating agents from gaseous streams, as indicated hereinabove, has been accomplished by various techniques, such as by contact with a selective solvent for the volatile component to be recovered. Another technique for the recovery of such volatile materials employs a particle form selective adsorbent, such as activated charcoal, molecular sieves, activated alumina and the like. Various techniques employed for the recovery of volatile materials from a stream containing the same are disclosed in numerous patents, U.S. Pat. Nos. 4,102,983; 4,227,891; 4,339,248; 4,265,945; 4,441,896; 4,101,297. The disclosures of the above-identified patents are herein incorporated and made part of this disclosure.

For the most part, however, the techniques and processes and equipment which have been previously employed for the recovery of volatile solvents and the like from gaseous streams containing the same have not been completely satisfactory, particularly as applied for the recovery of volatile solvents or pollutants from an air stream containing the same in a minor amount, such as an amount in the range about 5–10,000 ppm by weight or volume In connection with the recovery of valuable solvents and treating agents from such air streams or the recovery of noxious or noisome solvents and/or pollutants from such air streams, it is desirable to recover as much as possible such materials, preferably with a recovery or removal efficiency of at least about 90%, and preferably so that the resulting treated stream contains such a small amount of solvent or pollutant therein that either the economics of the process permits the discharge of the treated stream into the environment and/or the discharge thereof does not disturb the environment.

Accordingly, it is an object of this invention to provide an improved process for the recovery of materials from gaseous streams, such as air streams, containing the same.

It is another object of this invention to provide a process for the recovery of materials, such as solvents, from gaseous streams containing the same, with substantially minimum energy or heat requirements to carry out or operate the process.

How these and other objects of this invention are achieved will become apparent in the light of the accompanying disclosure and the drawings wherein:

FIG. 1 schematically illustrates one embodiment of the practices of this invention for the recovery of a volatile material or solvent from the gas or air stream containing the same; and wherein FIG. 2 schematically illustrates another embodiment of the practices of this invention employing or involving more steps and/or equipment for optimization of the overall process from the point of view of energy requirements and recovery of the volatile materials to be removed and recovered.

SUMMARY OF THE INVENTION

Pollutants or valuable solvents or chemicals in a gaseous or air stream are removed by contacting the gaseous stream containing the same in an absorption zone or absorber or contactor with a liquid selective solvent for the pollutant or material in the gaseous stream to be removed. Upon contact with the liquid selective solvent, these materials in the gaseous stream being treated are absorbed or dissolved therein and the liquid selective solvent, now having these materials or pollutants dissolved therein, is removed. The resulting treated gaseous stream can usually then be discharged to the environment since it now has a substantially reduced pollutant content, such as a pollutant content or concentration which permits the treated gaseous stream to be discharged into the environment and/or does not economically justify further recovery of the pollutant or other material therefrom.

The liquid selective solvent, now having the pollutant or other materials dissolved therein, is removed and heated, followed by or combined with a reduced pressure, to release the pollutant therefrom in a volatilized or gaseous form which is then separately recovered, such as by condensation. The resulting heated liquid selective solvent now, having a substantially reduced pollutant content, is then returned to the absorption zone after having been cooled, such as by indirect heat exchange with the liquid selective solvent leaving the absorption zone or absorber or contactor where the liquid selective solvent first came into contact with the gaseous stream containing the pollutant or other material to be removed. It is thus seen that the liquid selective solvent is recycled throughout the process, first contacting the gaseous stream in the absorption or contacting zone at a relatively low temperature to pick up pollutant therefrom, the liquid selective solvent then withdrawn and heated to release the pollutant therefrom for collection and/or recovery and the liquid selective solvent then cooled to a lower temperature, such as by indirect heat exchange with the pollutant containing liquid selective solvent leaving the absorption or contacting zone so that the liquid selective solvent is returned or recycled to the absorption or contacting zone to pick up and recover additional pollutant from the fluid stream being treated The aforesaid operations are carried out continuously or on a substantially continuous basis.

The initial contact between the liquid selective solvent and the fluid stream containing the pollutant or other material to be removed therefrom can be effected in any equipment suitable for liquid-gas contact. Suitable such equipment include a packed tower or a spray tower In the practices of this invention a tray tower is preferred to carry out contact between the liquid selective solvent and a gaseous stream being treated since the use of a tray tower for effecting contact between a gaseous stream and the liquid selective solvent permits the absorption of a higher concentration of the material to be absorbed in the liquid selective solvent and this, in turn, reduces the amount of selective solvent which must be handled or treated which, in turn, reduces the size and cost of the other components employed in the overall process, as well as reducing energy consumption.

The contact between the liquid selective solvent and the gaseous stream being treated is preferably carried out, not only continuously, although a batch operation is possible depending upon the economics and/or the make-up of the fluid stream being treated, but also countercurrently, i.e. in the absorption or contacting zone the liquid solvent enters at one end thereof and the gaseous stream being treated enters the other end thereof with the resulting treated gaseous stream exiting that end of the absorption or contacting zone where the liquid selective solvent was introduced and the liquid selective solvent being removed or discharged from the absorption or contacting zone at that end where the gaseous stream to be treated was introduced.

Although countercurrent contact between the liquid selective solvent and the gas stream being treated is preferred, co-current or cross flow contact between the fluid stream to be treated and the liquid selective solvent can also be employed In a co-current contacting operation the fluid stream and the liquid selective solvent enter the absorption or contacting zone at essentially the one or same end thereof and the resulting treated fluid stream and the selective solvent is removed from the other end or same end of the absorption zone.

It was indicated hereinabove that cross current contact between the gaseous phase to be treated, and the liquid selective solvent can be employed in the practices of this invention. In cross current contact the solvent is usually admitted to the top portion of a packed tower or system which permits the distribution of the liquid selective solvent so as to present a high contact surface area relative to the gaseous stream to be treated As the liquid selective solvent moves downwardly, such as vertically, within the liquid selective solvent wetted, packed contacting tower or contacting section, the gaseous stream to be treated is passed perpendicularly or transversely with respect to the flow of the liquid selective solvent. The gaseous phase moves through the packed tower which contains a downwardly moving film of liquid selective solvent and intimate contact takes place between the transversely moving gas phase and the downwardly moving or falling film of liquid selective solvent The liquid selective solvent is usually recovered at the bottom of the contacting zone and the resulting treated gaseous phase is recovered after having moved transversely through the contacting zone.

In the practices of this invention the selective solvent employed should desirably have a high boiling point and a low vapor pressure, exhibit selectivity and/or high solvent capacity for the material or pollutant in the gaseous stream to be removed. More particularly, the selective solvent in the case of gas-liquid contact should have an affinity for the material to be removed from the gaseous stream and have, in the instance when a gaseous stream is treated, a high Henry Law's constant K for the material to be removed ($c = KP$) where c is the concentration of the gaseous material to be removed in the solvent, K is the Henry Law's constant and P is the vapor pressure of the pollutant material to be removed above the liquid mixture of the selective solvent and the pollutant. Desirably, the selective solvent employed in the practices of this invention should not foam or be substantially non-foaming when aerated, be readily available at a relatively low cost, be thermally stable, exhibit low heat capacity ($Cp$) and have low or substantially no toxicity.

After the selective solvent has absorbed its capacity or the limit of the material or pollutant to be removed from the gaseous stream being treated under the conditions of operation of the absorption or contacting zone, the resulting pollutant-enriched liquid selective solvent is removed, heated and introduced into a desorption or stripping zone or tower which is desirably maintained under a reduced pressure relative to the pressure maintained within the absorption zone. Upon introduction into the desorption tower or the stripper, the pollutant or material in the selective solvent is flashed or released or discharged therefrom and is separately recovered, leaving behind the selective solvent now substantially depleted of pollutant Theoretically, depending upon the pollutant or material to be removed and the effectiveness or selectivity of the selective solvent employed, it is possible under under some circumstances to operate the absorption zone and the desorportion zone or stripper isothermally with the desorption zone or stripper, however, being operated at a substantially reduced pressure relative to the pressure maintained or the absorption zone. In this operation energy requirements would be substantially reduced but an isothermal operation with respect to the operation of the absorption and desorption zones, with the desorption zone being operated at a pressure substantially reduced relative to the desorption zone would be practical for only a limited number of situations wherein the affinity of the selective solvent for the material or pollutant to be removed is substantially or strongly pressure-dependent.

Illustrative of those volatile materials or pollutants which are readily handled, removed and recovered from the gas stream containing the same when treated in accordance with the practices of this invention, are the relatively high vapor pressure organic materials, such as alcohols, ethers, esters, ketones, aldehydes, hydrocarbons, such as benzene, toluene, and the xylenes, trichloroethylene, ethyl alcohol, methyl alcohol, n-butyl acetate, ethyl acetate, methyl ethyl ketone, methylene chloride, formaldehyde, ethyl ether, methyl ethyl ether, acetaldehyde, acrolein, the various mercaptans, such as methyl mercaptan, ethyl mercaptan, the various amines, such as the methylamines, ethanolamine, the low molecular weight $C_3$–$C_6$ alkanes and cycloalkanes, the butadienes, the cyclopentadienes and the like, the volatile aromatic compounds and hydrocarbons and, indeed, substantially any volatile material which can be preferentially dissolved by direct contact with a liquid selective solvent therefor. Other materials which are removable and recoverable in accordance with the practices of this invention include arsine, phosphine, $H_2S$, $SO_2$ and other volatile inorganic and metallo-organic compounds.

As indicated hereinabove, various selective solvents are usefully employed in the practices of this invention. The liquid selective solvent may be water immiscible and is desirably selected to have a low vapor pressure at ambient temperatures and at temperatures in the range 200°–500° F. and to have a high boiling point at atmospheric pressure, such as a boiling point of at least about 500° F., more or less, at atmospheric pressure. Selective solvents which are useful in the practices of this invention include the adipates, succinates, glutarates, the various alkyl phthalates, and other esters of di- and mono-basic acids and glycols, the various organic phosphates, including the alkyl and aryl phosphates, particularly those phthalates and organic phosphates or organic phosphorus compounds which are liquid at about ambient temperature in the range 40°–90° F. and which are useful as plasticizers. Additionally, the selective solvents should be thermally stable and, as indicated hereinabove, exhibit low toxicity and desirably low heat capacity, low cost and low affinity for water, i.e. low solubility or solvent power for water or the liquid phase in contact therewith.

DETAILED DESCRIPTION OF THE INVENTION

Figure 1:
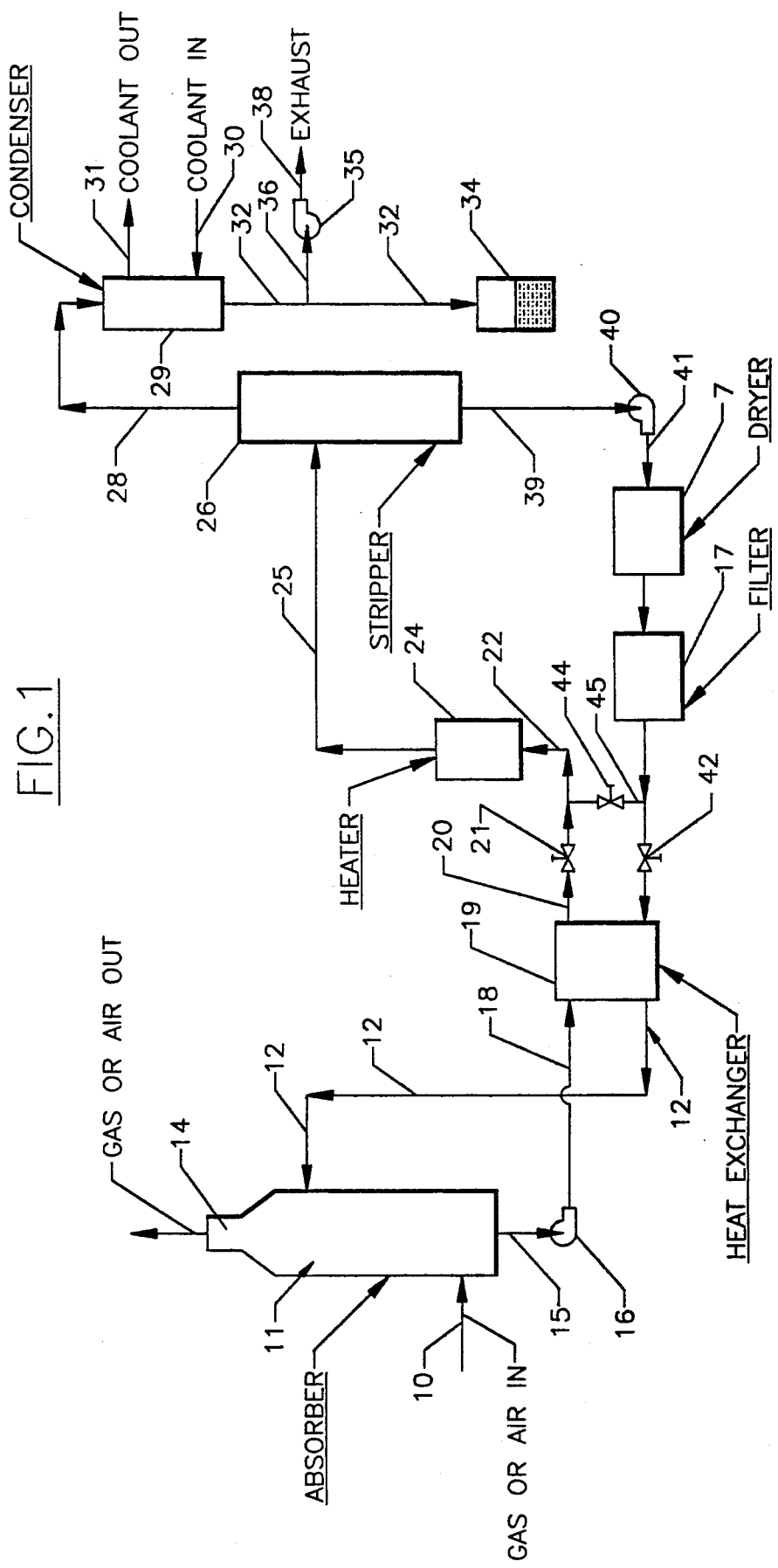

Compounds which are useful as plasticizers appear also to be effective as selective solvents in the practices of this invention since such compounds possess low vapor pressure at ambient and even at elevated temperatures up to about 400° F., have high boiling points, are thermally stable, inert and provide solvent power and selectivity for very many organic compounds.

To demonstrate the effectiveness, operability and utility of a liquid selective solvent, such as a dialkylphthalate (DAP) as a selective solvent in accordance with the practices of this invention, air at a rate of 0.5 cubic feet per minute (CFM) is bubbled through two impingers with each impinger containing 200 ml of a candidate dialkylphthalate. The air or gas exiting the impinger is sampled using a Draeger hydrocarbon detector tube. After, for example, 110 pump strokes the hydrocarbon indicating layer is only a third discolored. At 110 pump strokes, the maximum concentration of dialkylphthalate in the air stream is less than about 74 ppm. Various pressure data indicated that at ambient temperature the maximum concentration in the vapor would be about 15 ppm. These tests indicated that dialkylphthalates are acceptable as a liquid selective solvent for use in the practices of this invention. These tests indicated that the volatility of DAP is low enough to be acceptable for use as a liquid selective solvent in the practices of this invention.

In a series of tests to establish the effectiveness of a dialkylphthalate as a selective solvent in the practices of this invention, an air stream containing an organic pollutant or a volatilized organic solvent generated by sparging approximately 0.5 CFM of air through a volume of solvent is employed. The resulting organic solvent contaminated air stream is then pulled through impingers in contact with the dialkylphthalate solvent by means of a vacuum pump and monitored by a rotameter placed on the discharge of the vacuum pump Inlet and and outlet organic contaminant or volatile solvent concentrations is measured, See Table I.

TABLE I

| Organic Contaminant | Concentration Inlet (ppm) | Outlet (ppm) | Removal Efficiency % |
|---|---|---|---|
| Acetone | 4000–5000 | 100 | 97+ |
| Benzene | 420+ | 30 | 93+ |
| Toluene | 1900 | 100 | 95 |
| m-Xylene | 398 | 27 | 93 |
| m-Xylene | 747 | 30 | 96 |
| Trichloroethylene | 100 | 10 | 90 |

Test results of Table I show that dialkylphthalate is a useful scrubbing agent or selective solvent for the various volatile organic compounds tested. Although these tests indicate the effectiveness of dialkylphthalates as liquid selective solvents in the practices of this invention, economics indicated that a scrubber or adsorption column employing the liquid selective solvent desirably should recirculate the solvent with a constant slipstream being withdrawn from the recycled solvent This slipstream would then be heated to discharge and release any dissolved contaminant or volatile materials therein, all in accordance with the practices of this invention. With flashing or release of the dissolved contaminant or volatile materials therefrom, the resulting heated selective solvent could be cooled or recycled back to the scrubber.

During the tests for removing hydrocarbons from an air stream by scrubbing the air stream with a high molecular weight organic liquid, it was observed that the packed tower scrubber did not perform with the expected efficiency.

Tests with impingers had indicated that an efficiency of 90–98% could be expected Actual packed tower tests, however, showed efficiencies much lower, about 40–60%. Visual inspection through view ports of the tower packing during operation showed that the liquid selective solvent or scrubbing liquid seemed to "sheet" off the packing rather than have the normal wetting action usually associated with water. Different packings were tried, Tellerettes ®, Pall Rings ®, Intalox Saddles ® but the efficiency did not increase. Changing other operating parameters, i.e., liquid flow, air flow, etc., had very little effect on the overall efficiency of the tower.

A tray tower (sieve tray) was then tried Although the efficiency improved somewhat, to about 60–70%, it was still far below the anticipated 95%. Investigation of the physical properties of the organic scrubbing liquid or selective solvent employed indicated that the viscosity was one property that differed greatly from commonly used media. The viscosity of the selective solvent was approximately 55 cp. An experiment was set up to study the effect of viscosity on scrubbing efficiency. Various dialkyl phthalate solvents were tested because of the chemical similarities, availability, and wide range of viscosities. Dioctyl phthalate (DOP), viscosity about 60, and diethyl phthalate (DEP), viscosity about 10, were chosen Blends or mixtures of varying viscosities was prepared by mixing these two phthalates together in different proportions.

Methyl ethyl ketone vapors were scrubbed from an air stream using these mixtures and the efficiency determined by measuring the inlet and outlet concentrations with a gas chromatograph. These tests showed that the efficiency dropped off sharply when the viscosity of the scrubbing liquid or selective solvent exceeded approximately 30 cp.

A check employing diisohexyl phthalate, having a viscosity of approximately 33 cp as the selective solvent, was carried out. The efficiency of this solvent checked well with the results obtained with the DOP-DEP mixtures. Another scrubbing liquid system composed of mixture of Dioctyl Adipate (DOA) viscosity about 12 CP and Acetyltributyl Citrate (CA4) viscosity about 36 CP was prepared Again, removal efficiency of MEK from the air stream was determined vs. solution viscosity and again, the efficiency dropped sharply above 2514 30 cp.

It was discovered that the viscosity of the liquid selective solvent or scrubbing liquid in a direct countercurrent gas-liquid contact in a packed tower or sieve tray scrubber controls the scrubbing efficiency of the tower. It was observed that with liquid selective solvents having viscosities above about 20–30 cp, the normal operating parameters of a packed tower i.e., liquid flow, air flow, type or depth of packing have little or no effect on efficiency and this held true for a tray type tower although the efficiency is somewhat higher for this type of tower. It appeared that the viscosity of the liquid selective solvent was critical or controlling.

Liquid solvents which have been found to be useful in the practices of this invention, particularly blends or mixtures thereof, include:

| Solvent | Viscosity cp at 77° F. |
| --- | --- |
| diethyl phthalate (DEP | 9.5 |
| di-2-ethylhexyl phthalate (DOP) | 5.8 |
| di-2-ethylhexyl adipate (DOA) | 12 |
| acetyltributyl citrate (CA4) | 32.7 |
| diisohexyl phthalate (DHP) | 33 |

Useful blends of these solvents, which blends have a viscosity less than 30 cp, include 60 mol percent DEP and 40 mol percent DOP having a viscosity cf 21 cp, 80 mol percent DEP and 20 mol percent DOP having a viscosity of 17 cp, 80 mol percent CA4 and 20 mol percent DOA having a viscosity of 27 cp, 60 mol percent CA4 and 40 mol percent DOA having a viscosity of 21 cp, 40 mol percent CA4 and 60 mol percent DOA having a viscosity of 18 cp, and 80 mol percent DOA and 20 mol percent CA4 having a viscosity of about 14 cp.

To demonstrate the advantages of the practices of this invention, tests measuring the effect of viscosity on mass transfer properties of various solvents was investigated. Performance of each solvent was based on its removal efficiency of methyl ethyl ketone in direct gas-liquid countercurrent contact through a packed tower. Two systems of solvents with different viscosities were prepared by mixing a high and a low viscous solvent The two systems were blends of diethyl phthalate with dioctyl phthalate and blends of dioctyl adipate with acetyltributyl citrate. For both systems, the removal efficiency dropped sharply when the viscosity of the solvent exceeded approximately 30 cp. Also, the performance of diisohexyl phthalate, considering its viscosity, was in reasonable agreement with what was predicted from the performance of DOP/DEP system which has similar mass transfer properties Test performance data for the solvent DEP/DOP system both at 80% flooding and constant gas and liquid rates, indicate a better performance for the system as the viscosity of the solvent is decreased, particularly below 30 cp. Also, a more drastic improvement in removal efficiency is evident at 80% flooding because the less viscous solution allows for higher liquid rates through the column to achieve optimum operating conditions In addition, at 80% flooding a more pronounced drop in efficiency is evident when the viscosity is greater than 30 cp. Performance data for the solvent DOA/CA4 system at 80% flooding show that efficiency that drop as the viscosity of the solution exceeds 30 cp and performance is affected dramatically when the viscosity of the solvent exceeded approximately 30 cp (150 Saybolt Universal seconds equals about 32 cp).

Reference is now made to FIG. 1 of the drawings which illustrates one version of the practices of this invention as applied to the recovery of volatilized pollutants or other materials from a gaseous or air stream In FIG. 1 a gas or air stream at ambient temperature, such as in the range 40°–100° F., and containing a contaminant, such as a volatile organic solvent, is introduced via line 10 into the lower portion or bottom of absorber or tray tower 11 wherein it is brought into direct countercurrent liquid-gas contact with a liquid selective solvent introduced into the other end or top portion of absorber 11 via line 12. The temperature of the selective solvent is at substantially ambient temperature in the range about 50°–110° F., more or less. After direct contact with the selective solvent introduced into scrubber 11, there issues via exit 14 from that end of the absorber near the point of introduction of the selective solvent thereinto a gaseous or air stream now substantially depleted with respect to the contaminant or volatile organic solvent From the other end or bottom of absorber 11 liquid selective solvent is withdrawn via line 15 and is moved by pump 16 and line 18 through indirect heat exchanger 19. The liquid selective solvent leaves indirect heat exchanger 19 via line 20 through control valve 21 and line 22 and then through heater 24 wherein it is heated to an elevated temperature in the range about 300°–500° F., more or less, and then passed via line 25 into desorber or stripper 26. Within stripper 26 which is maintained at a reduced pressure, such as subatmospheric pressure or a lower pressure than absorber 11, the contaminant or volatile organic material picked up by a selective solvent within absorber 11 is released or discharged or flashed and passed via line 28 to condenser 29 wherein the contaminant or the volatile organic material is condensed Condenser 29 is supplied with coolant, such as cooling water, which enters condenser 29 via line 30 and leaves via line 31. The resulting condensed volatile material is discharged from condenser 29 via line 32 to receiver 34 for collection and eventual recovery or disposal. Stripper 26 is maintained at a lower pressure relative to absorber 11 by means of vacuum pump or vacuum jet 35 which is in fluid communication with stripper 26 via line 36. The uncondensed gases exit through vacuum pump or jet 35 via line 38.

As indicated in FIG. 1, the stripped or lean selective solvent leaves the bottom of stripper 26 via line 39, is moved by a pump 40 via line 41 through drier 7 for removal of any water, then through filter 17 for solids removal and then through control valve 42 into heat exchanger 19 for indirect heat exchange relationship with the rich selective solvent from absorber entering heat exchanger 19 via line 18. Preferably drier 7 and filter 17 are positioned in line 18. Within heat exchanger 19 the relatively hot lean selective solvent passes in indirect heat exchange relationship with the relatively cool rich selective solvent and is cooled while at the same time the relatively hot lean liquid selective solvent serves to heat the rich selective solvent from absorber 11 before it enters heater 24 for heating therein before entering stripper 26 The resulting, now cooled lean selective solvent leaves heat exchanger 19 via line 12 and enters the upper portion of absorber 11 to contact additional contaminant or volatile organic material in the air stream entering via line 10 the other end or bottom of absorber 11 for removal of contaminant or volatile organic material therefrom. For operational control, such as temperature and flow control and start up or rapid heat up, valve 44 is provided in line 45 to bypass the liquid selective solvent moving through lines 22 or 41. Desirably, as indicated, drier 7 for $H_2O$ removal and filter 17 are provided in line 41 to clean up the selective solvent moving therethrough.

Figure 2:
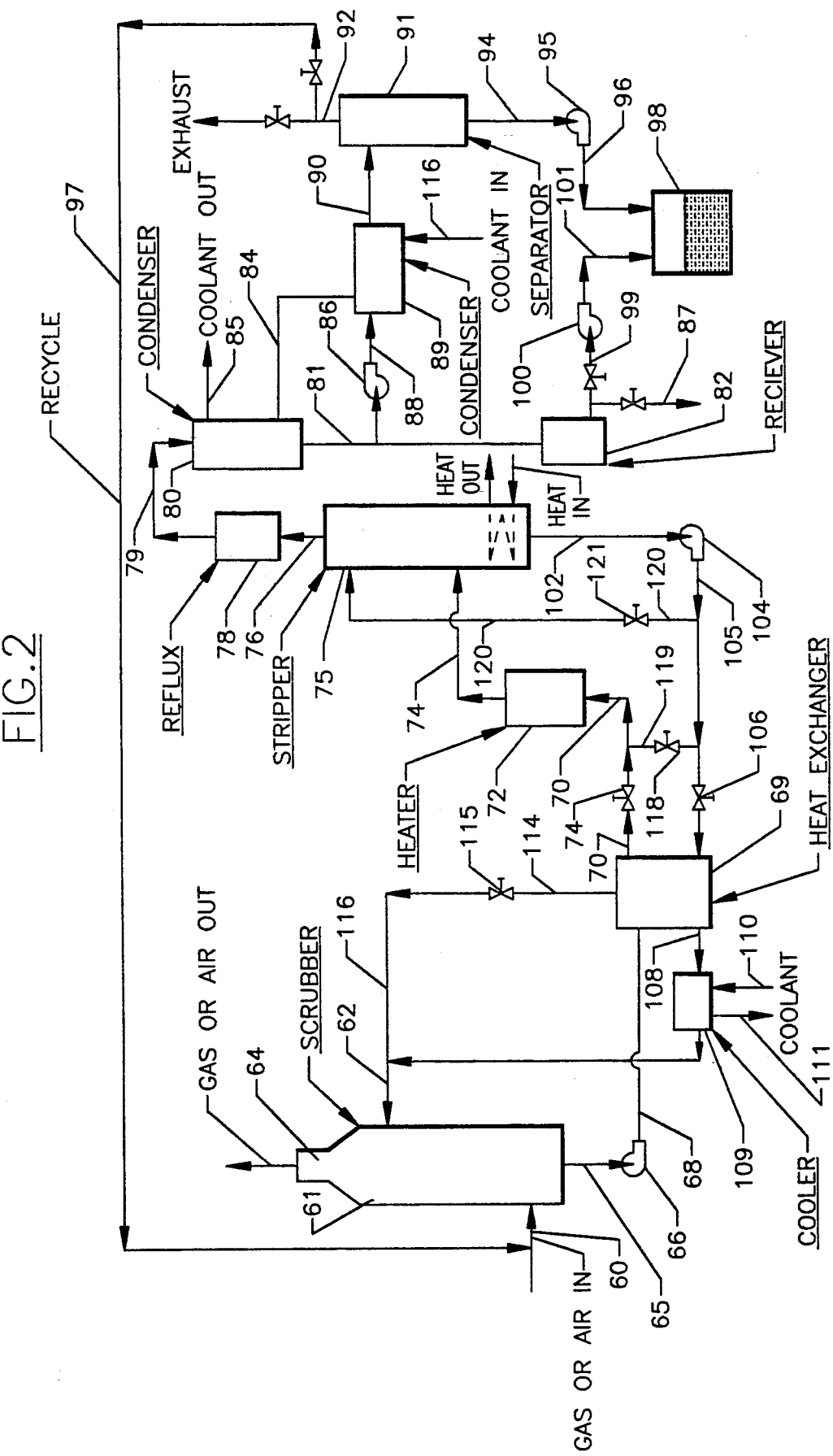

Reference is now made to FIG. 2 of the drawings which illustrates in another embodiment of the practices of this invention employing a more elaborate array of equipment and possessing greater versatility with respect to process control and ability to handle various contaminants and volatile organic materials which may be present in a gaseous or air stream to be treated illustrated in FIG. 2, a contaminant-containing gas or air stream, the contaminant being a volatile organic material, for example, a hydrocarbon, such as toluene, or a special volatile solvent employed in the paint, ink solvent and semi-conductor industries, such as xylene, n-butyl acetate or methylene chloride, is supplied via line 60 into scrubber or absorber 61, scrubber or absorber 61 being either a tray tower or packed tower. Scrubber 61 is operated at any suitable pressure, ambient, atmospheric, subatmospheric or superatmospheric pressure, depending upon the pressure of the gas or air stream entering scrubber 61 via line 60 Within scrubber 61 the gas or air stream supplied via line 60 comes into direct countercurrent liquid-gas contact with the liquid selective solvent supplied to the upper or other end of scrubber 61 via line 62. After contact with the liquid selective solvent within scrubber 61, the gas or air stream, now having a substantially depleted contaminant or volatile organic content, leaves the upper end of scrubber 61 via exit 64.

At the same time there is recovered from the bottom of scrubber 61 via line 65 liquid selective solvent now rich in contaminant or volatile organic compound content relative to the liquid selective solvent entering scrubber 61 via line 62. Desirably, scrubber 61 is operated substantially isothermally along its height or distance of travel or contact between the liquid selective solvent and the gas stream supplied to scrubber 61. If desired, scrubber 61 may be operated with a small temperature gradient, such as a differential of about 2°–40° F. between the ends of scrubber 61 where the treated gas exits via exit 64 and the liquid solvent exits via line 65. Usually scrubber 61 is operated at about ambient temperature in the range 40°–120° F., more or less.

The relatively rich liquid selective solvent exiting scrubber 61 via line 65 is moved by pump 66 and line 68 through heat exchanger 69 wherein it is heated and leaves via line 70 through control valve 71 into heater 72 wherein it is heated to a temperature substantially higher than the temperature at which the relatively rich liquid selective solvent exits scrubber 61 via line 65. Usually, the relative rich selective solvent leaves heater 72 via line 74 at an elevated temperature, substantially higher than the temperature at which the selective solvent left scrubber 61 via line 65, such as a temperature in the range 150°–600° F. The hot relatively rich selective solvent is then introduced via line 74 into stripper 75, stripper 75 desirably being maintained at a reduced pressure relative to the pressure maintained within scrubber 61,such as at a pressure in the range about 10–100 mm Hg absolute or such that the pressure differential relative to the pressure within scrubber 61 in the range 20–750 mm Hg, more or less, depending upon the pressure within absorber 61.

Upon entering stripper 75 the contaminant or volatile organic material contained within the rich hot liquid selective solvent flashes therefrom and leaves stripper 75 via line 76, enters condenser or reflux condenser 78 then via line 79 to condenser 80 and from condenser 80 via line 81 to receiver 82 for the collection of the condensed volatiles. As indicated, coolant, such as water, leaves condenser 80 via line 85. The uncondensed gases are removed from line 81 via vacuum pump 86 and passed via line 88 through condenser 89 for the removal of additional volatile materials which exit condenser 89 via line 90 into liquid-gas separator 91 from which the uncondensed gases are exhausted via valved line 92. The volatiles condensed within condenser 89 are passed via line 90 to separator 91 and leave separator 91 via line 94 and are moved via pump 95 and line 96 to receiver 98. Receiver 98 is also supplied with condensate recovered from condensate receiver 82 via line 99, pump 100 and line 101. Also, as illustrated in FIG. 2, the coolant or cooling water enters condenser 89 via line 118 and leaves via line 84 to enter condenser 80 from which it exits via line 85 Valved line 87 provides for the separate removal of condensation from receiver 82, if desired The now lean hot liquid selective solvent issues from stripper 75 via line 102 and pump 104 and is supplied via pump 104 and line 105 through control valve 106 to heat exchanger 69 wherein it passes in indirect heat exchange relationship with the rich relatively cool liquid selective solvent supplied via line 68 through heat exchanger 69 If desired, the resulting cooled lean selective solvent leaving heat exchanger 69 via line 108 may be further cooled within cooler or heat exchanger 109 which is supplied with coolant liquid via line 110 and which exits via line 111. Thereupon, the resulting cooled lean liquid selective solvent leaves cooler 109 via line 112 and is supplied via line 62 to scrubber 61 to contact additional contaminant or volatile organic compound in the entering gas or air supplied to scrubber 61 via line 60. As indicated, for control purposes, such as maintaining a temperature control within scrubber 61, a sufficient amount of rich relatively cool liquid selective solvent is removed from line 68 via line 114 through flow control valve 115 and line 116 for admixture with the cooled lean selective solvent supplied to scrubber 61 from cooler 109 via lines 112 and 62 Also for operational control line 118 with associated flow flow control valve 119 and line 120 with associated flow control valve 121 are provided for control of the liquid selective solvent entering stripper 75 and the operation of stripper 75 and for temperature control of the selective solvent leaving heater 72 via line 74 as well as controlling the temperature and other process control conditions within stripper 75. Valved line 97 is provided to recycle gases, if desired, from separator 91 to gas or air intake line 10 into absorber 11 for more complete recovery of any remaining recoverable volatile material or pollutant not vented from separator 91 via line 92. Stripper 75 is provided with reboiler or heater 77 for better or optional operational control and, also for operational control, line 99 from receiver 82 is provided with valved line 87 in communication with valved line 99.

Further illustrative of the practices of this invention, the following example is presented:

EXAMPLE

A toluene-contaminated air stream at or near ambient temperature, in the range about 40°–100° F. and containing approximately 10–10,000 ppm toluene is introduced into an absorber, such as a packed column but preferably a tray type scrubber, and is contacted therein, also at about ambient temperature, in the range about 50°–120° F., with a selective solvent for toluene.

The gas-liquid contacting is carried out in the absorber under conditions so as to effect at least about 90% removal of the toluene from the air stream containing the absorber.

The selective solvent, now containing toluene dissolved therein, is withdrawn from the bottom of the absorber and heated to an elevated temperature in the range about 325°–500° F., such as 400° F. The heating of the toluene-rich selective solvent is desirably carried out in a heat exchanger employing steam as the heating fluid but, if desired, an electrical heater in place of or supplemental to the steam-supplied heat exchanger might be employed.

The resulting heated toluene-containing selective solvent is then introduced into the stripper or regeneration section of the overall apparatus or system. The stripper or regeneration section comprises a single stage flash evaporating unit or a multi-stage distillation column, operated with or without reflux. To aid in the removal of the solvent from the selective solvent, the stripper is operated under subatmospheric pressure, such as a pressure in the range 20–100 mm Hg, absolute, e.g. about 50 mm Hg absolute The resulting toluene vapors released from the stripper are introduced into a condenser or condensing unit where the toluene vapors are condensed and collected in a receiving tank. At the same time the resulting hot solvent now substantially free of or having a reduced toluene content is removed from the bottom of the stripper and then cooled to about ambient temperature and returned to the absorber to contact additional toluenecontaining air stream.

In order for the overall operation to be economical, i.e. to reduce the overall energy requirements, the heat required for the operation of the stripper, i.e. the heat employed to heat the selective solvent to release the toluene therefrom, should be recovered as much as possible. This is accomplished by heating the ambient temperature toluene-rich selective solvent stream removed from the bottom of the absorber by indirect heat exchange relationship with the hot, lean selective solvent withdrawn from the stripper Additional cooling of the lean, stripped selective solvent, if required, can be accomplished by means of a heat exchanger employing water as coolant, and additional heating of the toluene rich selective solvent withdrawn from the absorber can be accomplished by passing the solvent from the absorber through a heat exchanger employing steam as the heating fluid or by other means for heating the solvent. Accordingly, one, two or three separate heat exchangers may be required and multi-stage heat exchangers may also be employed in the practices of this invention. The amount of additional heating or cooling required depends on the volume of the selective solvent moving within the system from the absorber to the stripper and back to the absorber, as well as temperatures of the selective solvent streams entering or leaving the various heat exchangers.

As will be apparent to those skilled in the art in the light of the foregoing disclosure, many substitutions, alterations and modifications are possible in the practices of this invention without departing from the spirit or scope thereof.

What is claimed is:

1. A method of removing a pollutant or other material from a gaseous stream containing the same which comprises contacting said gaseous stream with a liquid selective solvent composition consisting essentially of at least two of the selective solvents selected from the group consisting of diethyl phthalate, dioctyl phthalate, dioctyl adipate, acetyltributyl citrate and diisohexyl phthalte, said composition having a viscosity of less than about 30 centipoises at a temperature of about 77° F. and removing the resulting treated gaseous stream now having a reduced amount of said pollutant therein.

2. A method in accordance with claim 1 wherein said gaseous stream is an air stream.

3. A method in accordance with claim 2 wherein said gaseous stream is an air stream.

4. A method in accordance with claim 1 wherein said pollutant or other material is an organic compound.

5. In a gas-liquid contacting operation wherein a gaseous stream containing a component therein to be removed is brought into direct gas-liquid countercurrent contact with a liquid selective solvent for said component, the improvement which comprises employing as said selected solvent a selective solvent composition consisting essentially of at least two of the selective solvents selected from the group consisting of diethyl phthalate, dioctyl phthalate, dioctyl adipate, acetyltributyl citrate and diisohexyl phthalate, said composition having a viscosity of less than about 30 centipoises at a temperature of about 77° F.

* * * * *